(No Model.)
G. A. BRACHHAUSEN.
NOTE PLATE OR CYLINDER FOR MUSIC BOXES.
No. 538,034. Patented Apr. 23, 1895.
Fig.1.
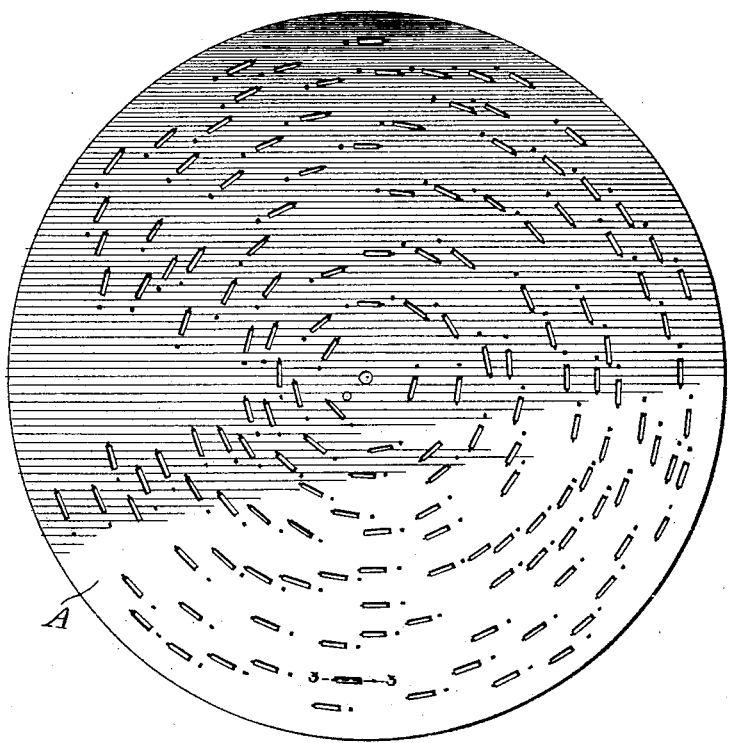
Fig.2.
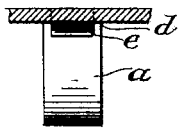
Fig.3.
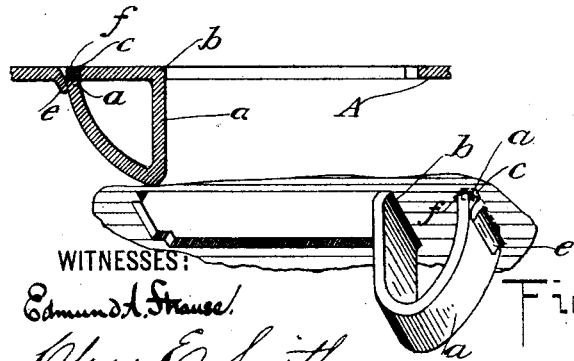
Fig.4.
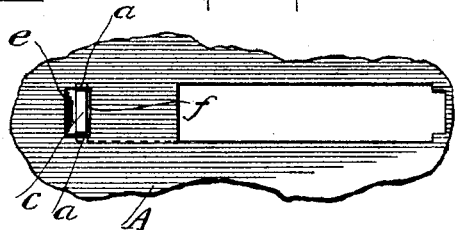
Fig.5.
WITNESSES:
Edmund A. Strause
Chas. E. Smith
INVENTOR
Gustav A. Brachhausen,
BY
Briesen & Knauth
ATTORNEYS
THE NORRIS PETERS CO., PHOTO-LITHO., WASHINGTON, D. C.

UNITED STATES PATENT OFFICE.

GUSTAV A. BRACHHAUSEN, OF HOBOKEN, NEW JERSEY.

NOTE PLATE OR CYLINDER FOR MUSIC-BOXES.

SPECIFICATION forming part of Letters Patent No. 538,034, dated April 23, 1895.

Application filed October 17, 1894. Serial No. 526,173. (No model.)

*To all whom it may concern:*

Be it known that I, GUSTAV A. BRACHHAUSEN, a subject of the Emperor of Germany, residing at Hoboken, Hudson county, in the State of New Jersey, have invented new and useful Improvements in Note Plates or Cylinders for Music-Boxes, of which the following is a full, clear, and exact description.

My invention relates to that character of note plates or cylinders which are provided with teeth or projections to directly or indirectly operate the musical tongues, and consists mainly in doubled teeth, each tooth formed in a single piece out of the body of the plate or cylinder and having means for retaining the free end thereof from displacement, such invention being an improvement on Patent No. 500,374, dated June 27, 1893, issued to Gustav A. Brachhausen and Paul Riessner.

In the accompanying drawings—Figure 1 is a top view of a note disk made in accordance with my invention. Fig. 2 is a fragmental detail showing an end view of one of the teeth. Fig. 3 is a side view of the same. Fig. 4 is an enlarged detail fragmental view of a portion of the plate in plan. Fig. 5 is an enlarged detail isometric view of one of the teeth and a portion of the plate.

In the drawings, A represents the body portion of a note plate, it being understood, however, that a cylinder, sheet or any other equivalent thereof might be used. The plate is made of flexible metal or other suitable material.

Teeth $a$ project from the plate A. Each tooth is formed of a single piece struck up from the body A and formed integral therewith at a portion or one end of the tooth as indicated at $b$. The elongated piece $a$, forming the tooth proper, is cut from the body of the plate A so as to leave a free and disconnected end preferably of the form shown in the drawings, with contracted tongue $c$ projecting from the end thereof so as to form shoulders $d$ for purposes which will be hereinafter referred to. A tongue $e$ of about the width of the tongue $c$ formed on the tooth proper, is struck up from the body of the plate or cylinder and projected in nearly a perpendicular direction thereto, leaving an aperture $f$ of the extent of said tongue.

Although each of the teeth is formed and the free end thereof secured at a single operation, for the purposes of clearness we will assume that the teeth have first been cut in the manner hereinbefore described. The free end of each tooth is then bent back in the direction of the solid portion of the plate from which it was cut, and the tongue $c$ projected into the aperture $f$ until the shoulders $d$ bear upon the plate, and the tooth itself bears against the tongue $e$ which forms an abutment therefor, preventing all lateral movement or displacement of the free end of said tooth, as shown in Fig. 5.

While I have shown and described with particularity the details of my construction, I would have it understood that I do not limit myself thereto since many changes may be made without departing from the spirit of my invention which is to produce a double tooth of a single piece of metal with suitable means for preventing the movement or displacement of the free end thereof.

It will be observed that by my invention I am enabled to form at a single operation a rigid tooth of any desired size or height which is provided with a support opposite to the working face thereof, and which has means for preventing the displacement of its free end.

Having described my invention, what I claim, and desire to secure by Letters Patent, is—

1. A note plate or cylinder having doubled teeth, each formed of a single continuous piece projecting from the body of said plate or cylinder, and means for connecting the free end of each tooth with said body portion, substantially as described.

2. A note plate or cylinder having doubled teeth, each tooth having a portion thereof formed integral with the body portion of said plate or cylinder, and a free disconnected portion turned toward and abutting upon said plate or cylinder, and means for securing said free and disconnected portion against displacement, substantially as described.

3. A note plate or cylinder having doubled teeth, each tooth having one end thereof formed integral with the body portion of said plate or cylinder and the other free and disconnected end turned toward and abutting upon the body portion of said plate or cylinder which is provided with an abutment adapted to bear upon a tooth at or near the free end thereof and prevent displacement thereof, substantially as described.

4. A note plate or cylinder having doubled teeth, each tooth having one portion thereof formed integral with the body portion of said note plate or cylinder, and a free and disconnected portion and an aperture in the body of the plate or cylinder adapted to receive the free portion of said tooth and prevent displacement thereof, substantially as described.

5. A note plate or cylinder having doubled teeth, each tooth having one end thereof formed integral with the body portion of said note plate or cylinder, and a free and disconnected end having shoulders formed thereon and an aperture in the body of the plate or cylinder adapted to receive the free end of said tooth and allow the shoulders thereon to bear upon the plate and prevent displacement of the tooth, substantially as described.

6. A note plate or cylinder having doubled teeth, each tooth having one end thereof integral with the body of the plate or cylinder and the other or free end provided with a contracted tongue forming shoulders, and an aperture with a tongue extending from one side thereof formed in the body of the plate or cylinder, the free end of the tooth being adapted to project into the aperture formed in the body of the plate or cylinder and to bear against the abutment formed thereon, substantially as described.

The foregoing specification of my improvements in note plates or cylinders for music-boxes signed by me this 1st day of October, 1894.

GUSTAV A. BRACHHAUSEN.

Witnesses:
GEO. E. MORSE,
HARRY M. TURK.